US008012585B2

(12) United States Patent
Liu et al.

(10) Patent No.: US 8,012,585 B2
(45) Date of Patent: Sep. 6, 2011

(54) CARBON NANOTUBE COMPOSITE FILM

(75) Inventors: Kai Liu, Beijing (CN); Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 279 days.

(21) Appl. No.: 12/321,557

(22) Filed: Jan. 22, 2009

(65) Prior Publication Data

US 2010/0233472 A1 Sep. 16, 2010

(30) Foreign Application Priority Data

Feb. 1, 2008 (CN) .......................... 2008 1 0066039

(51) Int. Cl.
*B32B 9/00* (2006.01)

(52) U.S. Cl. ...................... 428/408; 423/447.3; 977/742

(58) Field of Classification Search .................. 428/408; 423/447.1, 447.3; 977/742; 264/29.1
See application file for complete search history.

(56) References Cited

U.S. PATENT DOCUMENTS

| | | | | |
|---|---|---|---|---|
| 4,132,828 | A | 1/1979 | Nakamura et al. | |
| 4,461,923 | A | 7/1984 | Bogese, II | |
| 7,390,963 | B2 | 6/2008 | Scherer | |
| 7,413,474 | B2 | 8/2008 | Liu et al. | |
| 7,538,062 | B1 * | 5/2009 | Dai et al. | 502/185 |
| 7,704,480 | B2 | 4/2010 | Jiang et al. | |
| 7,750,240 | B2 | 7/2010 | Jiang et al. | |
| 2004/0020681 | A1 | 2/2004 | Hjortstam et al. | |
| 2004/0051432 | A1 | 3/2004 | Jiang et al. | |
| 2004/0053780 | A1 | 3/2004 | Jiang et al. | |
| 2007/0134555 | A1 * | 6/2007 | Ren et al. | 429/245 |
| 2007/0151744 | A1 | 7/2007 | Chen | |
| 2007/0293086 | A1 | 12/2007 | Liu et al. | |
| 2008/0170982 | A1 | 7/2008 | Zhang et al. | |
| 2009/0208742 | A1 | 8/2009 | Zhu et al. | |

FOREIGN PATENT DOCUMENTS

| | | |
|---|---|---|
| CN | 1483667 | 3/2004 |
| CN | 1484275 | 3/2004 |
| CN | 1992099 | 7/2007 |
| CN | 101003909 | 7/2007 |
| TW | 200724486 | 7/2007 |
| TW | 200802414 | 1/2008 |
| TW | 200939252 | 9/2009 |
| WO | 2006026539 | 3/2006 |

OTHER PUBLICATIONS

Y.Zhang et al.Metal coating on suspended carbon nanotubes and its implication to metal-tube interaction, Chemical Physics Letters,Nov. 24, 2000,35-41,331,Elsevier Science.

(Continued)

*Primary Examiner* — David R Sample
*Assistant Examiner* — Daniel Miller
(74) *Attorney, Agent, or Firm* — Altis Law Group, Inc.

(57) ABSTRACT

A carbon nanotube composite film includes a carbon nanotube film and at least one conductive coating. The carbon nanotube film includes an amount of carbon nanotubes. The carbon nanotubes are parallel to a surface of the carbon nanotube film. The least one conductive coating is disposed about the carbon nanotube.

14 Claims, 7 Drawing Sheets

OTHER PUBLICATIONS

Li et al., Electroless Plating of Carbon Nanotube with Gold, Journal of Materials Science & Engineering, vol. 22, No. 1, pp. 48-51, Feb. 2004. Passage 2 of Left Column of p. 48 and Paragraph 3.2 of pp. 49-50 may be relevant.

Mei Zhang et al., "Strong, Transparent, Multifunctional, Carbon Nanotube Sheets", Science, Aug. 19, 2005, pp. 1215-1219, vol. 309, U.S. Washington.

Y.Zhang et al., "Metal coating on suspended carbon nanotubes and its implication to metal-tube interaction", Chemical Physics Letters, Nov. 24, 2000, pp. 35-41, vol. 331.

Youngmi Cho et al., "Electronic Structure Tailoring and Selective Adsorption Mechanism of Metal-coated Nanotubes", Nanoletters, Dec. 18, 2007, pp. 81-86, vol. 8, U.S.

* cited by examiner

CARBON NANOTUBE COMPOSITE FILM

RELATED APPLICATIONS

This application is related to commonly-assigned application entitled, "METHOD FOR MAKING COAXIAL CABLE" Ser. No. 12/321,573; "CARBON NANOTUBE WIRE-LIKE STRUCTURE" Ser. No. 12/321,568; "METHOD FOR MAKING CARBON NANOTUBE TWISTED WIRE" Ser. No. 12/321,551; "COAXIAL CABLE" Ser. No. 12/321,572; "METHOD FOR MAKING CARBON NANOTUBE FILM" Ser. No. 12/321,570; "COAXIAL CABLE" Ser. No. 12/321,569. The disclosure of the above-identified application is incorporated herein by reference.

BACKGROUND

1. Field of the Invention

The present invention relates to composite films and, particularly, to a carbon nanotube composite film.

2. Discussion of Related Art

Carbon nanotubes (CNTs) are a novel carbonaceous material and received a great deal of interest since the early 1990s. Carbon nanotubes have interesting and potentially useful heat conducting, electrical conducting, and mechanical properties. The carbon nanotubes can be dispersed in a matrix to form a composite material. Then, the composite material can be screen-printed or chemical liquor deposited on a substrate to form a carbon nanotube composite material. The carbon nanotube composite material has properties of both carbon nanotubes and matrix material.

However, the above-mentioned methods for making the carbon nanotube composite film have many disadvantages. Firstly, the methods are relatively complex and costly. Secondly, the carbon nanotubes are prone to aggregate in the composite film. Thus, the strength and toughness of the composite film are relatively low. Thirdly, the carbon nanotubes in the composite film are disorganized and not arranged in any particular direction. Thus, the excellent heat and electrical conductivity cannot be fully utilized.

What is needed, therefore, is a carbon nanotube composite film and method for making the same in which the above problems are eliminated or at least alleviated.

SUMMARY

In one embodiment, a carbon nanotube composite film includes a carbon nanotube film and at least one conductive coating. The carbon nanotube film includes an amount of carbon nanotubes. The carbon nanotubes are parallel to a surface of the carbon nanotube film. The least one conductive coating is disposed about the carbon nanotube.

Other novel features and advantages of the present carbon nanotube composite film and method for making the same will become more apparent from the following detailed description of exemplary embodiments, when taken in conjunction with the accompanying drawings.

BRIEF DESCRIPTION OF THE DRAWINGS

Many aspects of the present carbon nanotube composite film and method for making the same can be better understood with references to the following drawings. The components in the drawings are not necessarily drawn to scale, the emphasis instead being placed upon clearly illustrating the principles of the present carbon nanotube composite film and method for making the same.

Figure 1:
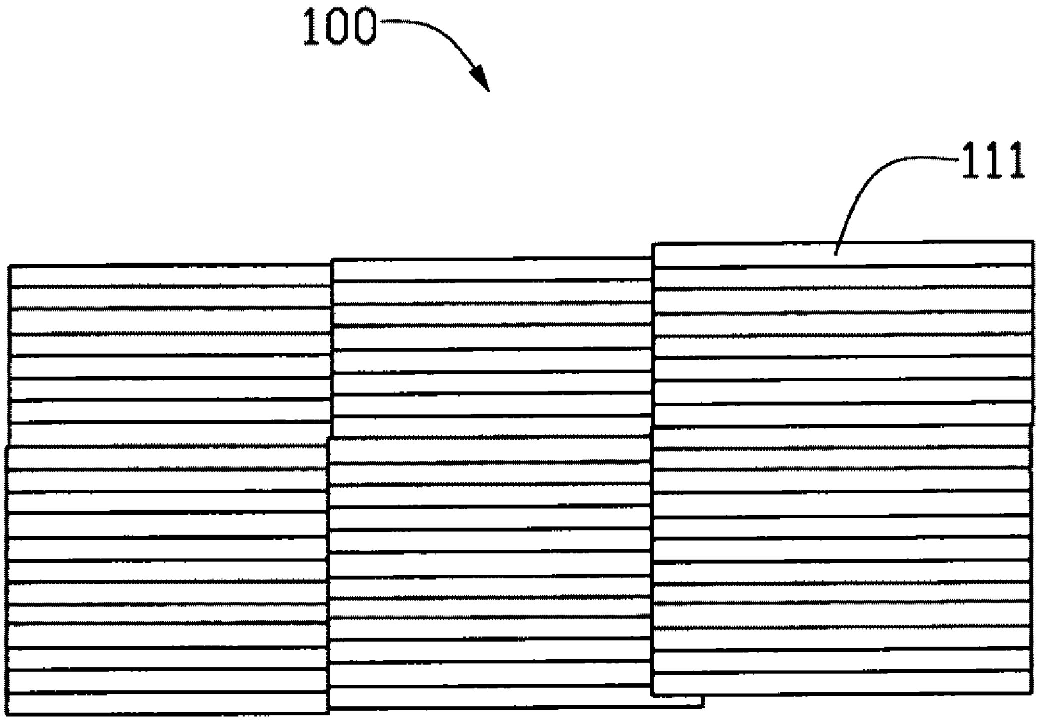
FIG. 1 is a schematic view of a carbon nanotube composite film in accordance with a present embodiment.

Corresponding reference characters indicate corresponding parts throughout the several views. The exemplifications set out herein illustrate at least one embodiment of the present carbon nanotube composite film and method for making the same, in at least one form, and such exemplifications are not to be construed as limiting the scope of the invention in any manner.

DETAILED DESCRIPTION OF EXEMPLARY EMBODIMENTS

References will now be made to the drawings to describe, in detail, embodiments of the present carbon nanotube composite film and method for making the same.

Referring to FIG. 1, a carbon nanotube composite film 100 includes a plurality of carbon nanotubes 111 and a layer of conductive material (not shown) covered on (i.e. surrounded) an outer surface of each individual carbon nanotube. The carbon nanotube composite film 100 is ordered, with the carbon nanotubes 111 therein paralleled to a surface of the carbon nanotube composite film 100 and aligned along a same direction. More specifically, the carbon nanotube composite film 100 includes a plurality of successively oriented carbon nanotubes 111 joined end-to-end by van der Waals attractive force. The carbon nanotubes 111 have a substantially equal length and are parallel to each other to form carbon nanotube segments. Each carbon nanotube segment includes a plurality of carbon nanotubes parallel to each other, and combined by van der Waals attractive force therebetween. The carbon nanotube segments can vary in width, thickness, uniformity and shape. The carbon nanotube segments are joined end-to-end by van der Waals attractive force to form the carbon nanotube composite film 100. The plurality of carbon nanotubes 111 joined end-to-end to form a free-standing carbon nanotube film 214. The "free-standing" means that the carbon nanotube film does not have to formed on a surface of a substrate to supported by the substrate, but sustain the film-shape by itself due to the great Van der Waals attractive force between the adjacent carbon nanotubes in the carbon nanotube film.

Figure 2:
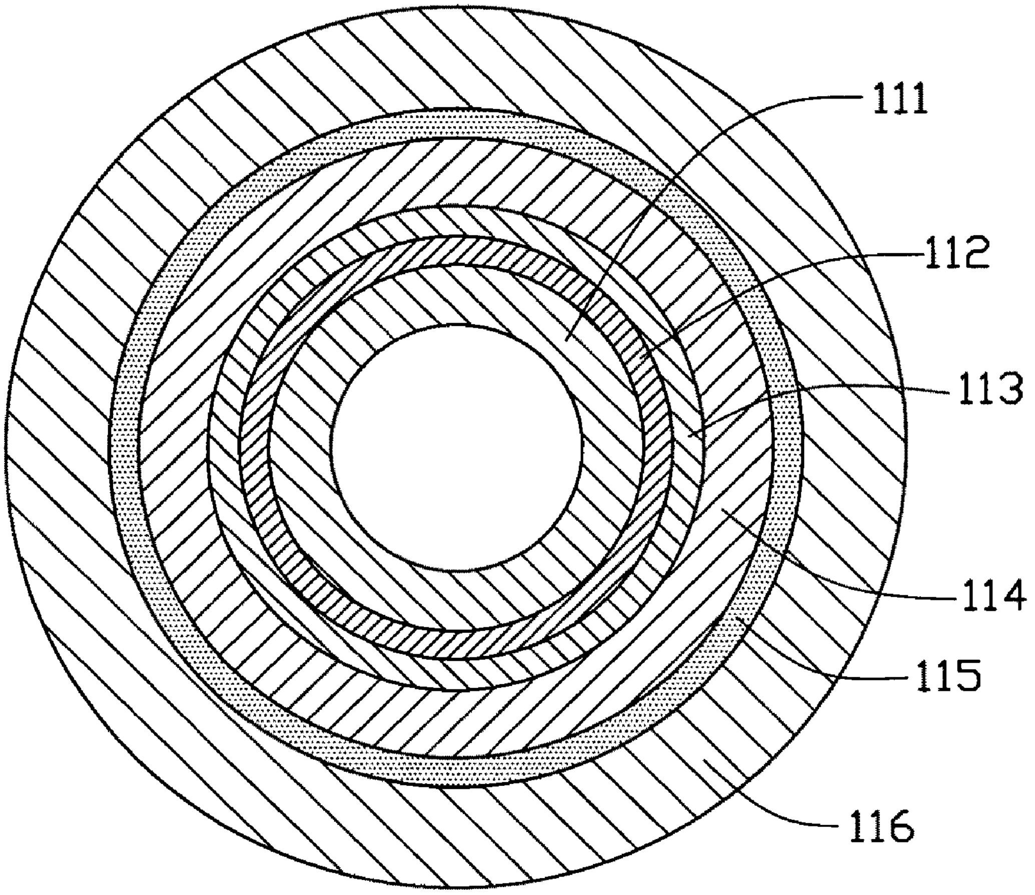
FIG. 2 is a schematic view of a single carbon nanotube in the carbon nanotube composite film of FIG. 1.

Referring to FIG. 2, each carbon nanotube 111 in the carbon nanotube composite film 100 is covered by at least one conductive coating on the outer surface thereof. A conductive coating is in direct contact with the outer surface of the individual carbon nanotube 111. More specifically, the at least one layer of conductive coating may further include a wetting layer 112, a transition layer 113, and an anti-oxidation layer 115. As mentioned above, the conductive coating has at least one conductive layer 114. In the present embodiment, the conductive coating includes all of the aforementioned elements, the wetting layer 112 is the innermost layer, contactingly covers the surface of the carbon nanotube 111, and direct contact with the carbon nanotube 111. The transition layer 113 enwraps the wetting layer 112. The conductive layer 114 enwraps the transition layer 113. The anti-oxidation layer 115 enwraps the conductive layer 114.

Typically, wettability between carbon nanotubes and most kinds of metal is poor. The wetting layer 112 is configured to provide a good transition between the carbon nanotube 111 and the conductive layer 114. The material of the wetting layer 112 can be selected from a group consisting of iron (Fe), cobalt (Co), nickel (Ni), palladium (Pd), titanium (Ti), and alloys thereof. A thickness of the wetting layer 112 approximately ranges from 1 to 10 nanometers. In the present embodiment, the material of the wetting layer 112 is Ni and the thickness of the wetting layer 112 is about 2 nanometers. The use of a wetting layer 112 is optional.

The transition layer 113 is arranged for combining the wetting layer 112 with the conductive layer 114. The material of the transition layer 113 can be combined with the material of the wetting layer 112 as well as the material of the conductive layer 114, such as copper (Cu), silver (Ag), and alloys thereof. A thickness of the transition layer 113 approximately ranges from 1 to 10 nanometers. In the present embodiment, the material of the transition layer 113 is Cu and the thickness is about 2 nanometers. The use of a transition layer 113 is optional.

The conductive layer 114 is arranged for enhancing the conductivity of the carbon nanotube composite film 100. The material of the conductive layer 114 can be selected from any suitable conductive material including the group consisting of Cu, Ag, gold (Au) and alloys thereof. A thickness of the conductive layer 114 approximately ranges from 1 to 20 nanometers. In the present embodiment, the material of the conductive layer 114 is Ag and the thickness is about 10 nanometers.

The anti-oxidation layer 115 is configured to prevent the conducting layer 114 from being oxidized by exposure to the air and prevent reduction of the conductivity of the carbon nanotube composite film 100. The material of the anti-oxidation layer 115 can be any suitable material including Au, platinum (Pt), and any other anti-oxidation metallic materials or alloys thereof. A thickness of the anti-oxidation layer 115 ranges from about 1 to about 10 nanometers. In the present embodiment, the material of the anti-oxidation layer 115 is Pt and the thickness is about 2 nanometers. The use of an anti-oxidation layer 115 is optional.

Figure 3:
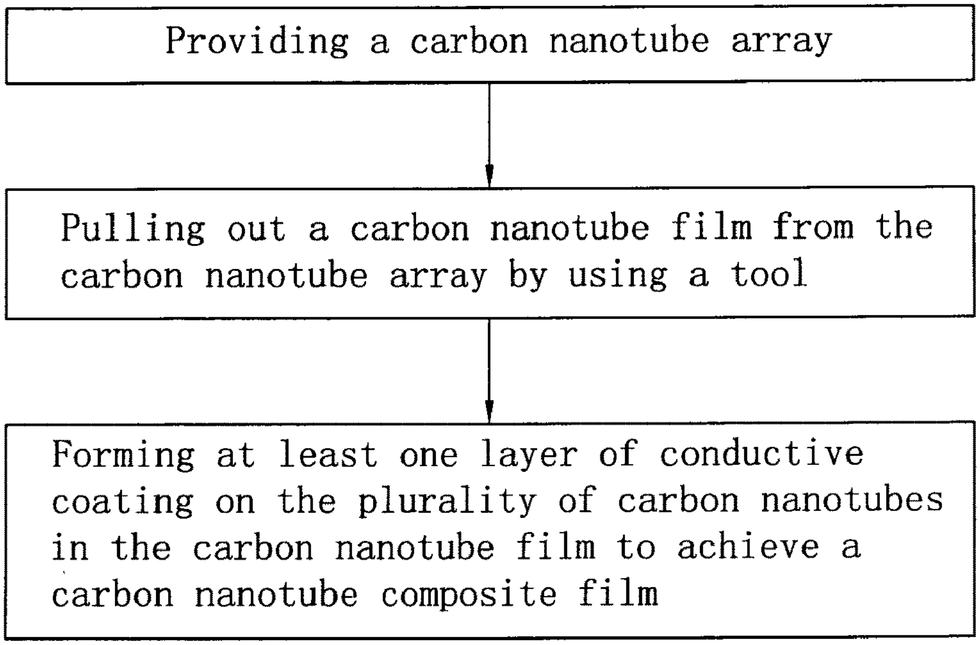
FIG. 3 is a flow chart of a method for making the carbon nanotube composite film of FIG. 1.
Figure 4:
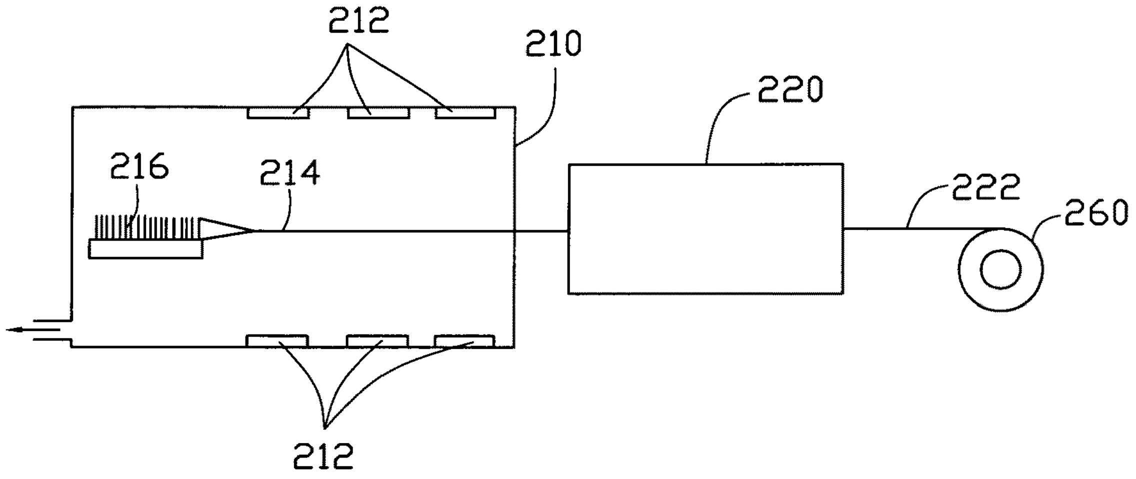
FIG. 4 is an system for making the carbon nanotube composite film of FIG. 1.

Furthermore, a strengthening layer 116 can be applied the outer surface of the layer of conductive coating to enhance the strength of the carbon nanotube composite film 100. The material of the strengthening layer 116 can be any suitable material including a polymer with high strength, such as polyvinyl acetate (PVA), polyvinyl chloride (PVC), polyethylene (PE), or paraphenylene benzobisoxazole (PBO). A thickness of the strengthening layer 116 ranges from about 0.1 to about 1 micron. In the present embodiment, the strengthening layer 116 covers the anti-oxidation layer 115, the material of the strengthening layer 116 is PVA, and the thickness of the strengthening layer is about 0.5 microns. The use of a strengthening layer is optional Referring to FIG. 3 and FIG. 4, a method for making the carbon nanotube composite film 222 includes the following steps: (a) providing a carbon nanotube array 216 and, specifically, a super-aligned carbon nanotube array 216; (b) pulling out a carbon nanotube film 214 from the carbon nanotube array 216 by using a tool (e.g., adhesive tape, pliers, tweezers, or another tool allowing multiple carbon nanotubes to be gripped and pulled simultaneously); and (c) forming at least one layer of conductive coating on the plurality of carbon nanotubes in the carbon nanotube film 214 to achieve a carbon nanotube composite film 222.

In step (a), a given super-aligned carbon nanotube array 216 can be formed by the following substeps: (a1) providing a substantially flat and smooth substrate; (a2) forming a catalyst layer on the substrate; (a3) annealing the substrate with the catalyst layer in air at a temperature approximately ranging from 700° C. to 900° C. for about 30 to 90 minutes; (a4) heating the substrate with the catalyst layer to a temperature approximately ranging from 500° C. to 740° C. in a furnace with a protective gas therein; and (a5) supplying a carbon source gas to the furnace for about 5 to 30 minutes and growing the super-aligned carbon nanotube array 216 on the substrate.

In step (a1), the substrate can be a P-type silicon wafer, an N-type silicon wafer, or a silicon wafer with a film of silicon dioxide thereon. In the present embodiment, a 4-inch P-type silicon wafer is used as the substrate.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned carbon nanotube array 216 can be approximately 200 to 400 microns in height and include a plurality of carbon nanotubes parallel to each other and approximately perpendicular to the substrate. The carbon nanotubes in the carbon nanotube array 216 can be single-walled carbon nanotubes, double-walled carbon nanotubes, or multi-walled carbon nanotubes. Diameters of the single-walled carbon nanotubes approximately range from 0.5 nanometers to 10 nanometers. Diameters of the double-walled carbon nanotubes approximately range from 1 nanometer to 50 nanometers. Diameters of the multi-walled carbon nanotubes approximately range from 1.5 nanometers to 50 nanometers.

The super-aligned carbon nanotube array 216 formed under the above conditions is essentially free of impurities such as carbonaceous or residual catalyst particles. The carbon nanotubes in the super-aligned carbon nanotube array 216 are closely packed together by van der Waals attractive force.

In step (b), the carbon nanotube film 214 includes a plurality of carbon nanotubes, and there are interspaces between adjacent two carbon nanotubes. Carbon nanotubes in the carbon nanotube film 214 can parallel to a surface of the carbon nanotube film 214. A distance between adjacent two carbon nanotubes can be larger than a diameter of the carbon nanotubes. The carbon nanotube film 214 is a free-standing film. The carbon nanotube film 214 can be formed by the following substeps: (b1) selecting a plurality of carbon nanotube segments having a predetermined width from the super-aligned carbon nanotube array 216; and (b2) pulling the carbon nanotube segments at an even/uniform speed to achieve a uniform carbon nanotube film 214.

In step (b1), the carbon nanotube segments having a predetermined width can be selected by using an adhesive tape such as the tool to contact the super-aligned carbon nanotube array 216. Each carbon nanotube segment includes a plurality of carbon nanotubes parallel to each other. In step (b2), the pulling direction is arbitrary (e.g., substantially perpendicular to the growing direction of the super-aligned carbon nanotube array 216).

Figure 5:
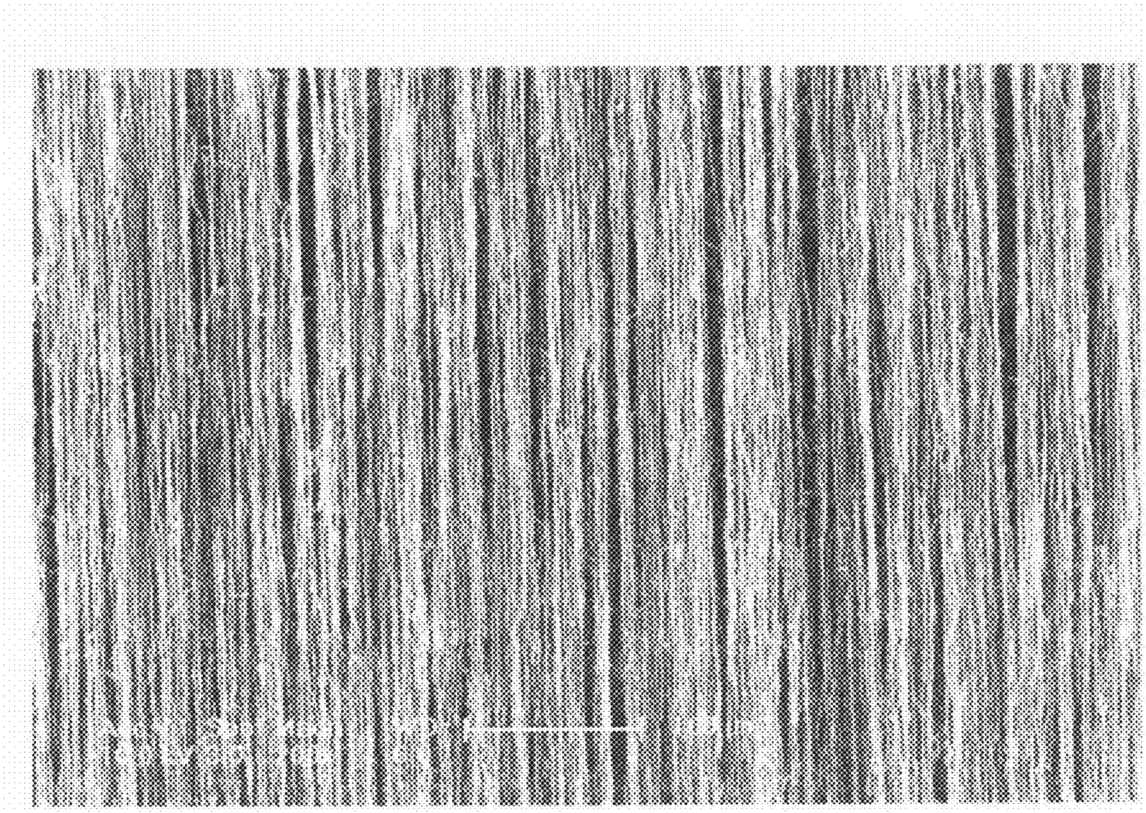
FIG. 5 shows a Scanning Electron Microscope (SEM) image of a carbon nanotube film used in the method for making the carbon nanotube composite film of FIG. 1.

More specifically, during the pulling process, as the initial carbon nanotube segments are drawn out, other carbon nanotube segments are also drawn out end-to-end due to the van der Waals attractive force between ends of adjacent segments. This process of drawing ensures that a continuous, uniform carbon nanotube film 214 having a predetermined width can be formed. Referring to FIG. 5, the carbon nanotube film 214 includes a plurality of carbon nanotubes joined end-to-end. The carbon nanotubes in the carbon nanotube film 214 are all substantially parallel to the pulling/drawing direction of the carbon nanotube film 214, and the carbon nanotube film 214 produced in such manner can be selectively formed to have a predetermined width. The carbon nanotube film 214 formed by the pulling/drawing method has superior uniformity of thickness and conductivity over a typically disordered carbon nanotube film 214. Furthermore, the pulling/drawing method is simple, fast, and suitable for industrial applications.

The width of the carbon nanotube film 214 depends on a size of the carbon nanotube array 216. The length of the carbon nanotube film 214 can be arbitrarily set as desired and can be above 100 meters. When the substrate is a 4-inch P-type silicon wafer, as in the present embodiment, the width of the carbon nanotube film 216 approximately ranges from 0.01 centimeters to 10 centimeters, and the thickness of the carbon nanotube film 216 approximately ranges from 0.5 nanometers to 100 microns.

In step (c), the at least one conductive coating can be formed on the carbon nanotubes in carbon nanotube film by a physical vapor deposition (PVD) method such as a vacuum evaporation or a spattering. In the present embodiment, the at least one conductive coating is formed by a vacuum evaporation method.

The vacuum evaporation method for forming the at least one conductive coating of step (c) can further include the following substeps: (c1) providing a vacuum container 210 including at least one vaporizing source 212; and (c2) heating the at least one vaporizing source 212 to deposit a conductive coating on two opposite surfaces of the carbon nanotube film 214.

In step (c1), the vacuum container 210 includes a depositing zone therein. At least one pair of vaporizing sources 212 includes an upper vaporizing source 212 located on a top surface of the depositing zone, and a lower vaporizing source 212 located on a bottom surface of the depositing zone. The two vaporizing sources 212 are opposite to each other. Each pair of vaporizing sources 212 is made of a type of metallic material. The materials in different pairs of vaporizing sources 212 can be arranged in the order of conductive coatings orderly formed on the carbon nanotube film. The pairs of vaporizing sources 212 can be arranged along a pulling direction of the carbon nanotube film 214 on the top and bottom surface of the depositing zone. The carbon nanotube film 214 is located in the vacuum container 210 and between the upper vaporizing source 212 and the lower vaporizing source 212. There is a distance between the carbon nanotube film 214 and the vaporizing sources 212. An upper surface of the carbon nanotube film 214 faces the upper vaporizing sources 212. A lower surface of the carbon nanotube film 214 faces the lower vaporizing sources 212. The vacuum container 210 can be evacuated by connecting with a vacuum pump (not shown).

Figure 6:
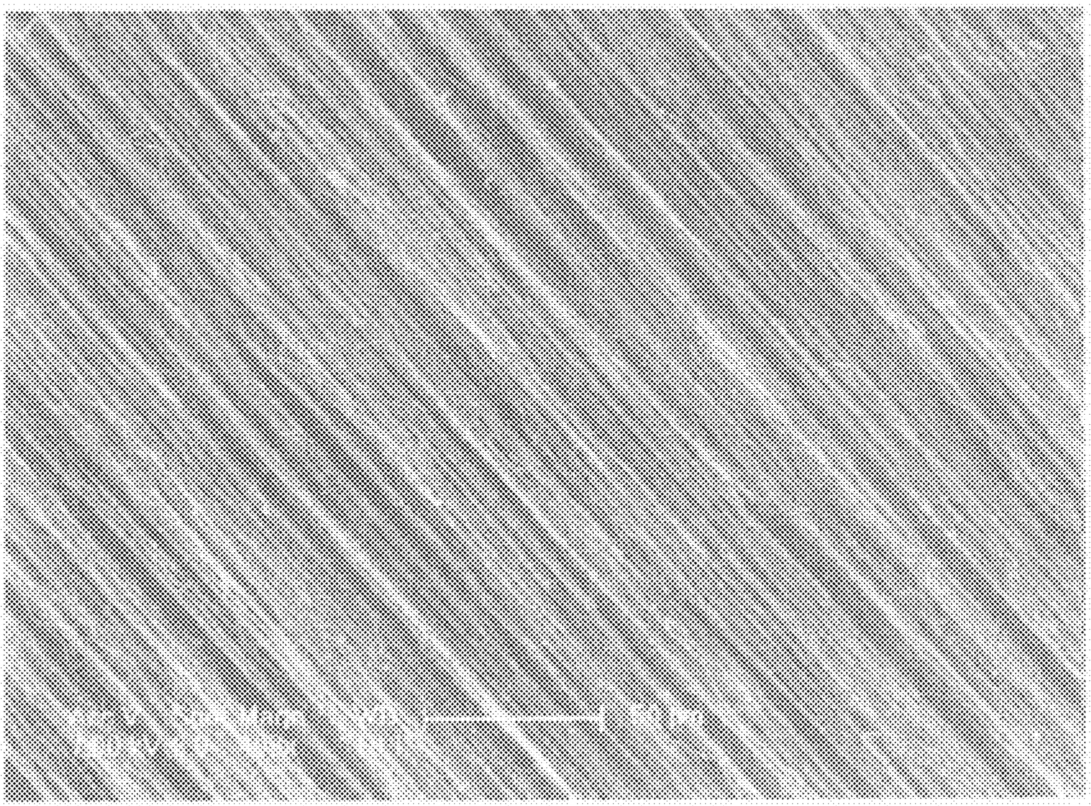
FIG. 6 shows a Scanning Electron Microscope (SEM) image of the carbon nanotube composite film of FIG. 1.
Figure 7:
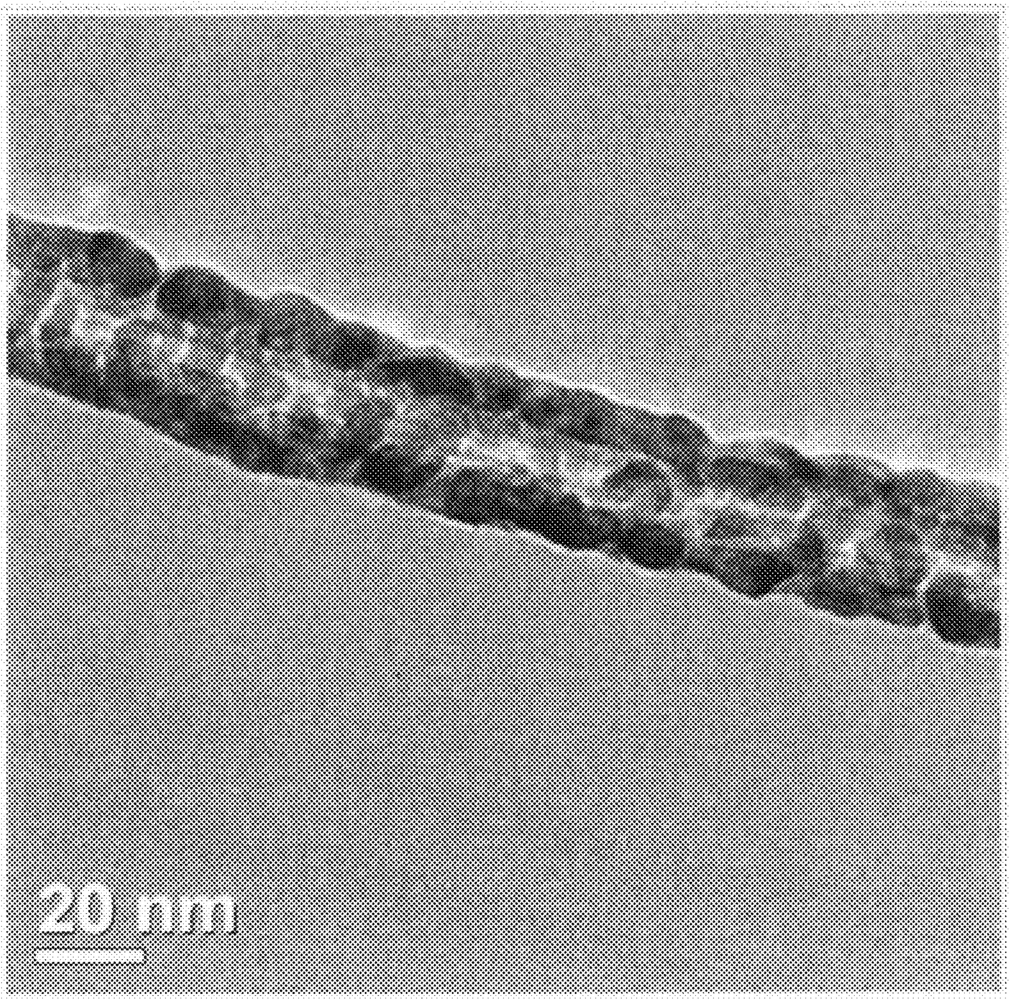
FIG. 7 shows a Transmission Electron Microscope (TEM) image of the carbon nanotube composite film of FIG. 1.

In step (c2), the vaporizing source 212 can be heated by a heating device (not shown). The material in the vaporizing source 212 is vaporized or sublimed to form a gas. The gas meets the cold carbon nanotube film 214 and coagulates on the upper surface and the lower surface of the carbon nanotube film 214. Due to a plurality interspaces existing between the carbon nanotubes in the carbon nanotube film 214, in addition to the carbon nanotube film 214 being relatively thin, the conductive material can be infiltrated in the interspaces in the carbon nanotube film 214 between the carbon nanotubes. As such, the conductive material can be deposited on the outer surface of most, if not all, of single carbon nanotubes. A microstructure of the carbon nanotube composite film 222 is shown in FIG. 6 and FIG. 7. A thickness of the carbon nanotube composite film 222 is in the range from about 1.5 nanometers to 1 millimeters. Without the strengthening layer 116, the thickness of the carbon nanotube composite film 222 is not much increased comparing with the thickness of the carbon nanotube film 214.

It is to be understood that a depositing area of each vaporizing source 212 can be adjusted by varying the distance between two adjacent vaporizing sources 212 or the distance between the carbon nanotube film and the vaporizing source 212. Several vaporizing sources 212 can be heating simultaneously, while the carbon nanotube film 214 is pulled through the depositing zone between the vaporizing sources 212 to form a layer of conductive coating.

To increase density of the gas in the depositing zone, and prevent oxidation of the conductive material, the vacuum degree in the vacuum container 210 is above 1 pascal (Pa). In the present embodiment, the vacuum degree is about $4\times10^{-4}$ Pa.

It is to be understood that the carbon nanotube array 216 formed in step (a) can be directly placed in the vacuum container 210. The carbon nanotube film 214 can be pulled in the vacuum container 210 and successively pass each vaporizing source 212, with each layer of conductive coating continuously depositing thereon. Thus, the pulling step and the depositing step can be performed simultaneously.

In the present embodiment, the method for forming the at least one conductive coating includes the following steps: forming a wetting layer on a surface of the carbon nanotube film 214; forming a transition layer on the wetting layer; forming a conductive layer on the transition layer; and forming an anti-oxidation layer on the conductive layer. In the above-described method, the steps of forming the wetting layer, the transition layer, and the anti-oxidation layer are optional.

It is to be understood that the method for forming at least one conductive coating on each of the carbon nanotubes in the carbon nanotube film 214 in step (b) can be a physical method such as vacuum evaporating or sputtering as described above, and can also be a chemical method such as electroplating or electroless plating. In the chemical method, the carbon nanotube film 214 can be disposed in a chemical solution.

Further, after step (c), a strengthening layer can be formed outside the layer of conductive material. More specifically, the carbon nanotube film 214 with the at least one conductive coating can be immersed in a container 220 with a liquid polymer therein. Thus, the entire surface of the carbon nanotube film 214 can be soaked with the liquid polymer. After concentration (i.e., being cured), a strengthening layer can be formed on the outside of the individually coated carbon nanotubes.

The carbon nanotube composite film 222 can be further collected by a roller 260 by coiling the carbon nanotube composite film 222 on the roller 260.

Optionally, the steps of forming the carbon nanotube film 214, the layer of conductive material, and the strengthening layer can be processed in a same vacuum container to achieve a continuous production of the carbon nanotube composite film 222.

Optionally, to increase the transparency of the carbon nanotube film 214, before step (c), the carbon nanotube film 214 can be treated by a laser to decrease the thickness of the carbon nanotube film 214.

In the present embodiment, the frequency of the laser is 1064 nanometers, the output power of the laser is about 20 mW, the scanning rate of the laser is about 10 mm/s. A focus lens of a laser device is removed, and a diameter of a bright spot formed by the irradiation of the laser on the surface of the carbon nanotube film is about 3 millimeters.

Laser treated and untreated carbon nanotube composite film 222 and carbon nanotube film 214 with, different conductive coatings, corresponding resistances and the transmittances of a visible light with a frequency of 550 nanometers are compared in the table 1.

TABLE 1

| No. | Treated or untreated with laser | Wetting layer/ Thickness | Conductive layer/ Thickness | Ohms per square (Ω) | Transmittance (%) |
|---|---|---|---|---|---|
| 1 | untreated | — | — | 1684 | 85.2 |
| 2 | untreated | Ni/2 nm | — | 1656 | 79.0 |
| 3 | untreated | Ni/2 nm | Au/3 nm | 504 | 74.6 |
| 5 | untreated | Ni/2 nm | Au/5 nm | 216 | 72.5 |
| 6 | treated | Ni/2 nm | Au/5 nm | 2127 | 92.8 |
| 7 | treated | Ni/2 nm | Au/10 nm | 1173 | 92.7 |
| 8 | treated | Ni/2 nm | Au/15 nm | 495 | 90.7 |
| 9 | treated | Ni/2 nm | Au/20 nm | 208 | 89.7 |

As shown in table 1, due to the conductive coating outside the carbon nanotubes in the carbon nanotube composite film 214, the resistance of the carbon nanotube composite film 222 is lower than the carbon nanotube film 214. However, the transmittance and transparency of the carbon nanotube composite film 222 is decreased as the thickness of the conductive coating increased. After treated with laser, the transmittance and transparency of the carbon nanotube composite film 222 is increased. To conclude from a large amount of testings, the resistance of the carbon nanotube composite film 222 can be decreased to about 50Ω, the transmittance of visible light can be increased to 95%.

In the present embodiment, the resistance of the carbon nanotube film 214 is above 1600 ohms. After depositing a Ni layer and an Au layer, the resistance of the carbon nanotube composite film 222 can reduces to 200 ohms. The transmittance of visible light is approximately 70% to 95%. Thus, the carbon nanotube composite film 222 in the present embodiment has a low resistance and a high transparency, and can be used as a transparent conductive film.

The carbon nanotube composite film provided in the present embodiment have the following superior properties: Firstly, the carbon nanotube composite film includes a plurality of oriented carbon nanotubes joined end-to-end by van der Waals attractive force. Thus, the carbon nanotube composite film has a high strength and toughness. Secondly, the outer surface of each carbon nanotube is covered by the layer of conductive material. Thus, the carbon nanotube composite film has a high conductivity. Thirdly, the carbon nanotube composite film has a high transparency and can be used as a transparent conductive film. Fourthly, the method for forming the carbon nanotube composite film is simple and relatively inexpensive. Additionally, the carbon nanotube composite film can be formed continuously and, thus, a mass production thereof can be achieved.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

The invention claimed is:

1. A carbon nanotube composite film comprising:

a carbon nanotube film comprising a plurality of carbon nanotubes, the carbon nanotubes being parallel to a surface of the carbon nanotube film; and at least one conductive coating disposed about the carbon nanotubes and in contact with a surface of the carbon nanotubes, wherein the at least one conductive coating comprises a conductive layer surrounding an individual carbon nanotube, a wetting layer located between the conductive layer and the individual carbon nanotube, and a transition layer located between the conductive layer and the wetting layer.

2. The carbon nanotube composite film as claimed in claim 1, wherein the carbon nanotubes are aligned along a same direction.

3. The carbon nanotube composite film as claimed in claim 1, wherein the carbon nanotubes have a same length and are joined end-to-end by van der Waals attractive force therebetween.

4. The carbon nanotube composite film as claimed in claim 1, wherein the material of the conductive layer comprises a material selected from the group consisting of copper, silver, gold and alloys thereof.

5. The carbon nanotube composite film as claimed in claim 1, wherein a thickness of the conductive layer ranges from about 1 to about 20 nanometers.

6. The carbon nanotube composite film as claimed in claim 1, wherein the material of the wetting layer is comprised of a material selected from the group consisting of iron, cobalt, nickel, palladium, titanium, and alloys thereof, and a thickness of the wetting layer ranges from about 1 to about 10 nanometers.

7. The carbon nanotube composite film as claimed in claim 1, wherein the material of the transition layer comprises a material selected from the group consisting of copper, silver and alloys thereof, and a thickness of the transition layer ranges from about 1 to about 10 nanometers.

8. The carbon nanotube composite film as claimed in claim 1, wherein the conductive coating further comprises an anti-oxidation layer about the conductive layer.

9. The carbon nanotube composite film as claimed in claim 8, wherein the material of the anti-oxidation layer is comprised of a material selected from the group consisting gold, platinum and alloys thereof, and a thickness of the anti-oxidation layer ranges from about 1 to about 10 nanometers.

10. The carbon nanotube composite film as claimed in claim 1, further comprising a strengthening layer outside the conductive coating.

11. The carbon nanotube composite film as claimed in claim 10, wherein the material of the strengthening layer is comprised of a material selected from the group consisting polyvinyl acetate, polyvinyl chloride, polyethylene, paraphenylene benzobisoxazole, and combinations thereof, and a thickness of the strengthening layer ranges from about 0.1 to about 1 micron.

12. A carbon nanotube composite comprising:

at least one carbon nanotube; and at least one conductive coating in contact with a surface of the at least one carbon nanotube, wherein the at least one conductive coating comprises a conductive layer surrounding the at least one carbon nanotube, a wetting layer located between the conductive layer and the at least one carbon nanotube, and a transition layer located between the conductive layer and the wetting layer.

13. The carbon nanotube composite as claimed in claim 12, wherein the at least one conductive coating further comprises an anti-oxidation layer surrounding the conductive layer.

14. The carbon nanotube composite as claimed in claim 12, further comprising a strengthening layer surrounding the at least one conductive coating.

* * * * *